(12) United States Patent
Yamazaki et al.

(10) Patent No.: US 6,329,815 B1
(45) Date of Patent: Dec. 11, 2001

(54) ROTATION SENSOR ACCOMMODABLE TO AN ECCENTRICITY OF A ROTATION PORTION OF A MEMBER TO BE DETECTED RELATIVE TO A ROTATING SHAFT OF THE SENSOR

(75) Inventors: Kenji Yamazaki; Toshio Ogawa, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/438,449

(22) Filed: Nov. 12, 1999

(30) Foreign Application Priority Data

Nov. 18, 1998 (JP) .................................................. 10-328462

(51) Int. Cl.$^7$ ....................................................... G01B 7/14
(52) U.S. Cl. .................................. 324/207.25; 324/207.12
(58) Field of Search ........................... 324/207.25, 207.12, 324/173, 174, 166, 207.23, 207.22

(56) References Cited

U.S. PATENT DOCUMENTS 4,495,700   1/1985   Ernst .
4,901,562   2/1990   Beakas et al. .
5,088,319   2/1992   Hirose et al. .

FOREIGN PATENT DOCUMENTS

39 42 826 A 1   6/1991   (DE) .
0 762 081 A1    3/1997   (EP) .
4-17455         2/1992   (JP) .

*Primary Examiner*—Walter Snow
(74) *Attorney, Agent, or Firm*—Brinks Hofer Gilson & Lione (57) ABSTRACT

There is provided a highly reliable rotation sensor which is capable of accurate detection of a rotation state. The rotation sensor comprises: a rotor rotating together with a rotation portion of a detection side; a first supporting member for rotatably supporting the rotor; and a detecting member secured to the first supporting member for detecting a rotation state of the rotor. The first supporting member is supported movably in both directions, that is, an X direction orthogonal to the direction of the rotating shaft of the rotor and a Y direction which is orthogonal to the direction of the rotating shaft of the rotor and orthogonal to the X direction.

9 Claims, 11 Drawing Sheets

ROTATION SENSOR ACCOMMODABLE TO AN ECCENTRICITY OF A ROTATION PORTION OF A MEMBER TO BE DETECTED RELATIVE TO A ROTATING SHAFT OF THE SENSOR

BACKGROUND OF THE INVENTION

1. Field of the Invention

The present invention relates to a rotation sensor such as a throttle position sensor, attached to a throttle valve, for detecting an opening level of the valve, and more particularly to a rotation sensor accommodable to the eccentricity of a rotation portion of the valve relative to the rotating shaft of the sensor.

2. Description of the Related Art

Figure 23:
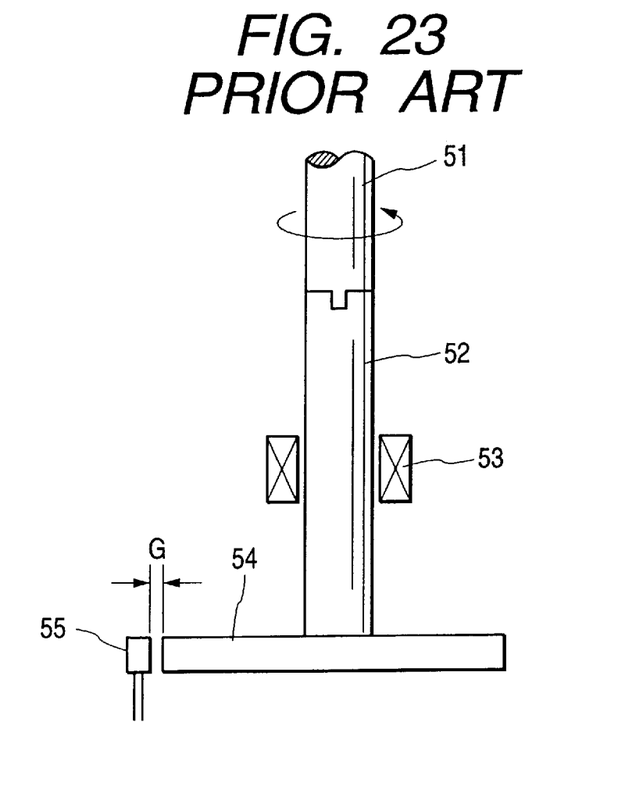
FIG. 23 is a schematic diagram showing a conventional rotation sensor.

FIG. 23 is a schematic diagram showing a conventional rotation sensor as described above. As shown in the figure, a shaft 52 is coupled to a rotor 51 of a detection side, the shaft 52 is rotatably supported at a location of a bearing 53, and a magnetized code plate 54 that is integrally connected to the tip of the shaft 52. In the vicinity of the circumference of the code plate 54 that is disposed a magnetism detecting element 55, which is supported by a casing (not shown).

By way of example, the conventional rotation sensor, which has a so-called one-point support configuration in which the shaft 52 is supported at one point, has the shaft 52 supported by the bearing 53 with some backlash so that it is freely rotatable. If the rotor 51 is attached to the shaft 52 with their center axes in misalignment or if in its place the rotor 51 itself rotates eccentrically, then the code plate 54 will rotate eccentrically, and a gap G between the code plate and the magnetism detecting element 55 will change greatly. As a consequence, a linear output will not be obtained in a magnetic variable resistor. This has been a disadvantage of conventional rotation sensors.

If the shaft 52 is supported at two points to solve this disadvantage, although a relative positional relationship between the code plate 54 and the magnetism detecting element 55 can be maintained to a degree of the clearance between the shaft 52 and the bearing 53, without enhancing the accuracy of mounting dimensions, detailed detection of rotation states would become impossible because of actuating force decreased due to center misalignment. Another disadvantage is that the eccentricity of the shaft 52 causes wear on the two-point support portions, reducing the operating life of the sensor.

SUMMARY OF THE INVENTION

An object of the present invention is to solve these disadvantages of the related art and provide a highly reliable rotation sensor capable of correctly detecting rotation states.

To achieve the above described object, the present invention provides a rotation sensor comprising:

a rotor having a magnetized portion on, e.g., a circumferential side, rotating together with a rotation portion of a detection side such as, e.g., a throttle valve;

a first supporting member for rotatably supporting the rotor; and a detecting member, secured to the first supporting member, and having a hole IC for detecting a rotation state of the rotor, wherein the first supporting member is supported movably in both directions, that is, an X direction which is orthogonal to the direction of the rotating shaft of the rotor and a Y direction which is orthogonal to the direction of the rotating shaft of the rotor and orthogonal to the X direction.

According to the present invention, as previously described, since both the rotor and the detecting member for detecting a rotation state thereof are supported by the first supporting member and the rotor and the detecting member are movable together in the X and Y directions, even if the rotation portion becomes eccentric, the rotor and the detecting member together can follow the eccentricity and the spacing between the rotor and the detecting member is always constant, and therefore there is no output variation due to the eccentricity of the rotation portion.

Since this construction eliminates the need to support the shaft at two points, there can be provided a rotation sensor which is free of decrease in actuating force, capable of correct detection of a rotation state, and highly reliable.

A rotation sensor of the present invention may comprise:

a second supporting member for supporting the first supporting member; and a third supporting member for supporting the second supporting member, wherein the first supporting member is supported movably to the Y direction by the second supporting member, and the second supporting member is supported movably to the X direction by the third supporting member.

According to the present invention, if both the first supporting member and the third supporting member are constructed from a synthetic resin and the second supporting member is constructed from metal, friction resistance is reduced and the rotation sensor moves smoothly in the X and Y directions, so that it can detect a rotation state more correctly.

According to the present invention, Y-direction guide means which permits the travel of the first supporting member in the Y direction and prevents the travel thereof in the X direction is provided in the second supporting member, and X-direction guide means which permits the travel of the second supporting member in the X direction and prevents the travel thereof in the Y direction is provided in the third supporting member, whereby the travel in the X and Y directions is distinctly divided so that the rotation sensor can respond appropriately to the eccentricity of a rotation portion.

According to the present invention, since the third supporting member is formed with an exterior member of the sensor in a fixed state, the third supporting member need not be provided additionally, so that parts can be reduced in quantity, size, and weight.

According to the present invention, a terminal is provided in the third supporting member, and the terminal and the detecting member are connected by a flexible connecting wire, whereby the first supporting member moves without trouble and a rotation state can be correctly detected.

According to the present invention, a concave housing part is formed in the first supporting member and the detecting member is inserted and secured within the housing member, and thereby the detecting member is disposed close to the rotor, so that correct detection of a rotation state can be made and the detecting member does not project substantially from the first supporting member, providing no obstacle for the travel of the first supporting member.

According to the present invention, if the first supporting member is of shape of almost rectangular frame and is disposed in sliding on the second supporting member, the first supporting member moves stably.

According to the present invention, since the rotor has a magnetized portion on the circumferential side and the detecting member is a magnetism detecting element, the reliability of detection is high and the configuration of the detection part is simple and inexpensive.

According to the present invention, since a rotation part of a detection side is a throttle valve, there can be provided a highly reliable throttle position sensor capable of correct detection of a rotation state.

DESCRIPTION OF THE PREFERRED EMBODIMENTS

Figure 1:
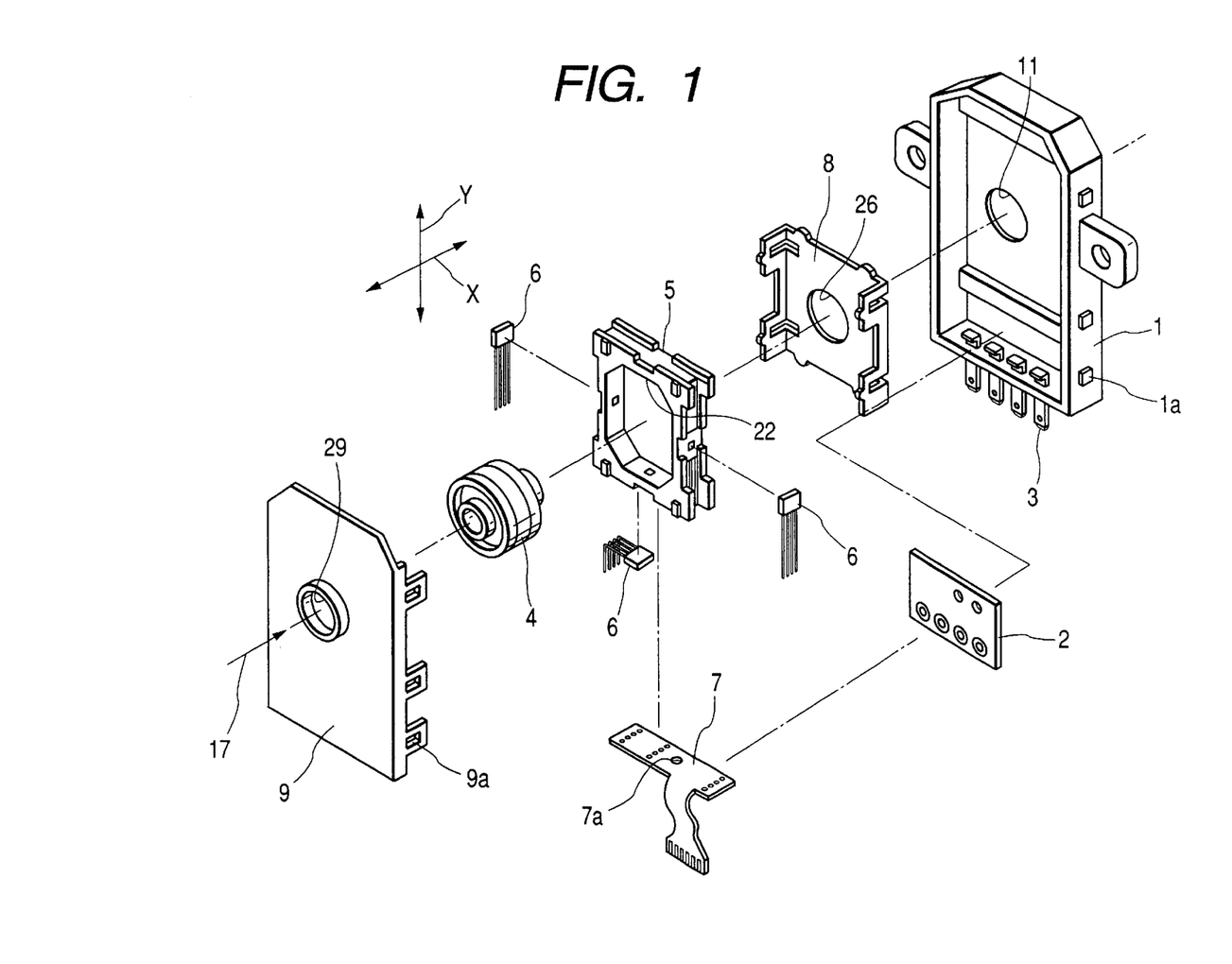
FIG. 1 is an exploded perspective view showing a rough shape of a rotation sensor according to the present invention.
Figure 2:
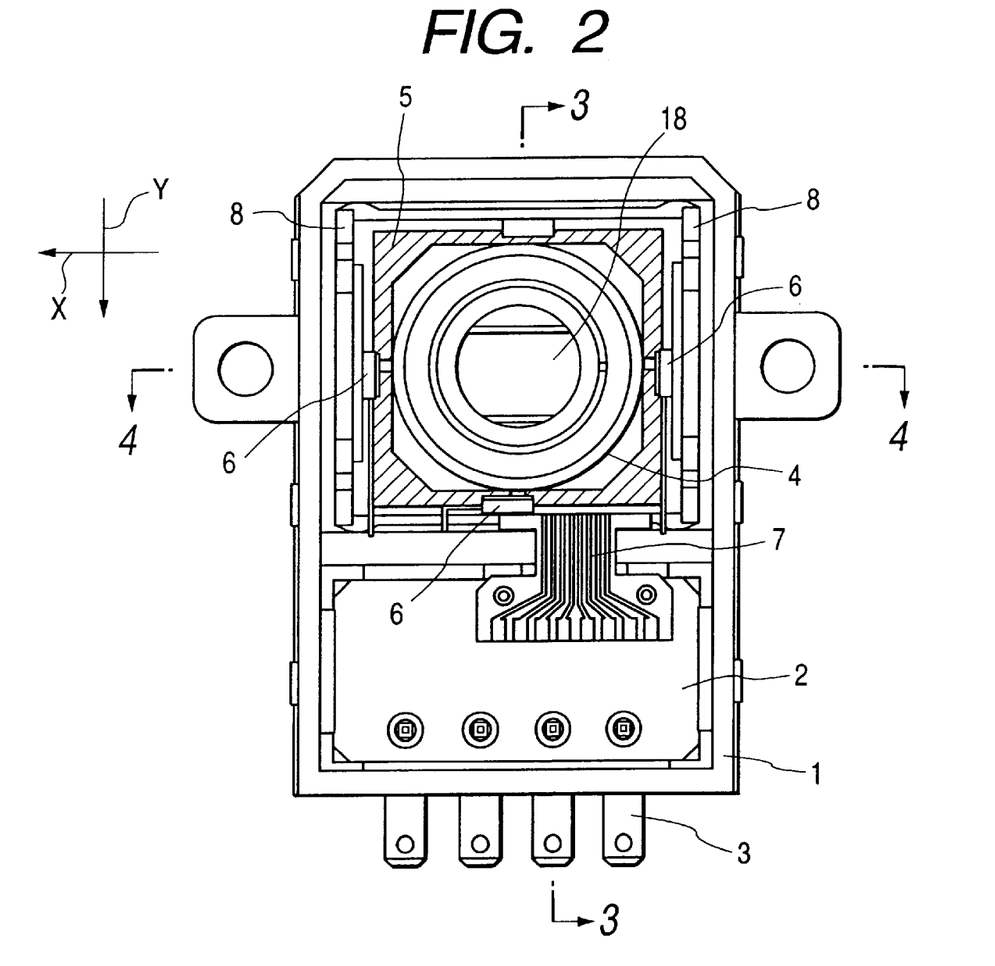
FIG. 2 is a front cross-sectional view of the rotation sensor.
Figure 3:
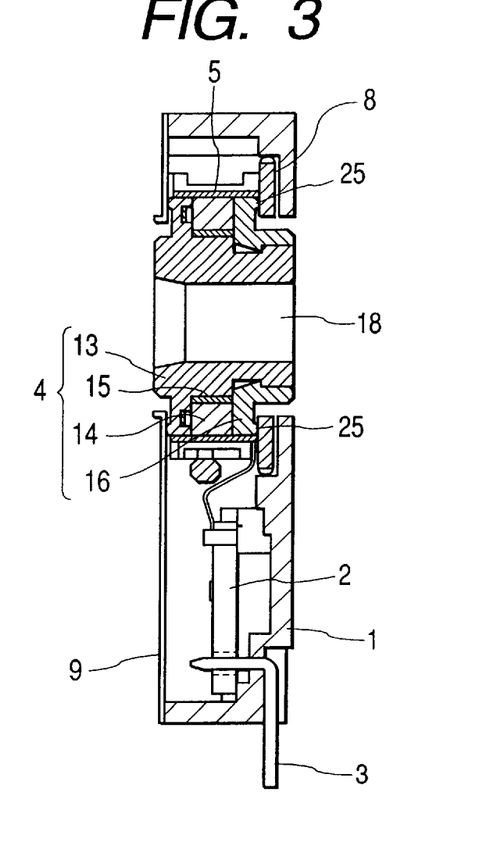
FIG. 3 is a cross-sectional view taken along the line 3—3 of FIG. 2.
Figure 4:
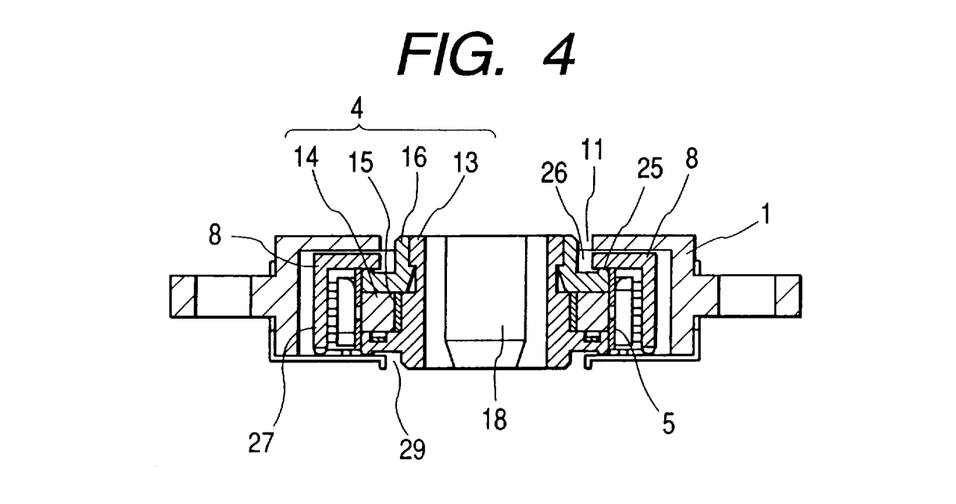
FIG. 4 is a cross-sectional view taken along the line 4—4 of FIG. 2.

Hereinafter, a rotation sensor according to an embodiment of the present invention will be described with the accompanying drawings. FIG. 1 is a perspective view showing a rough shape of a rotation sensor according to the embodiment; FIG. 2 is a front cross-sectional view of the rotation sensor; FIG. 3 is a cross-sectional view taken along the line 3—3 of FIG. 2; and FIG. 4 is a cross-sectional view taken along the line 4—4 of FIG. 2.

In these figures, the reference numeral 1 denotes a housing and 2 denotes a printed wiring board, which is disposed within the housing 1 and connected to plural terminals 3 fitted to the housing 1 as shown in FIGS. 2 and 3. The reference numeral 4 denotes an almost cylindrical rotor; 5, a first supporting member of almost frame shape; 6, three detecting members each consisting of a hole IC, secured to the first supporting member 5; 7, a flexible printed wiring board of almost T-character shape, with the three detecting members 6 soldered, connected to the printed wiring board 2; 8, a second supporting member; and 9, a cover of almost plate shape.

Figure 5:
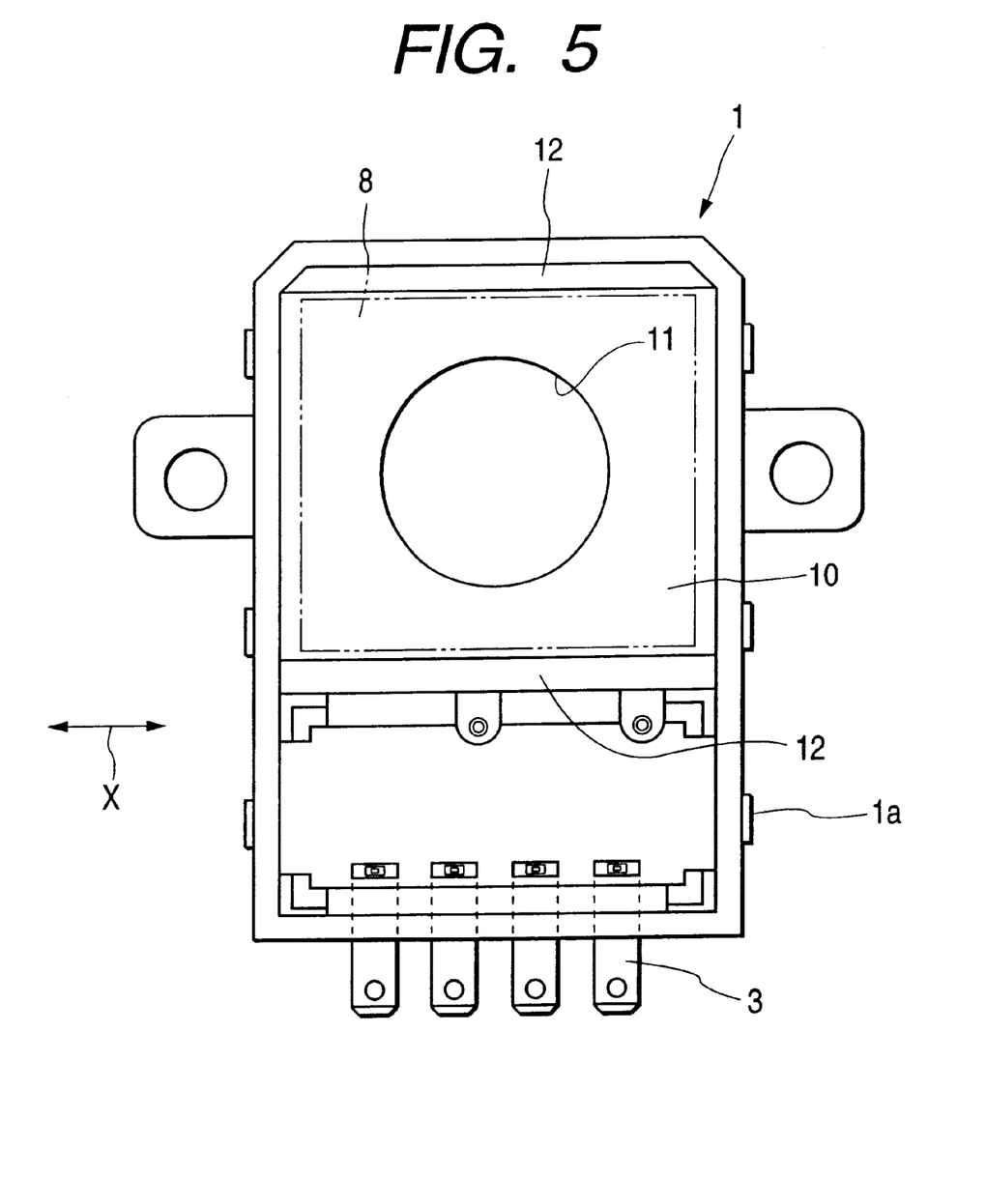
FIG. 5 is a front view of a housing used in the rotation sensor.
Figure 6:
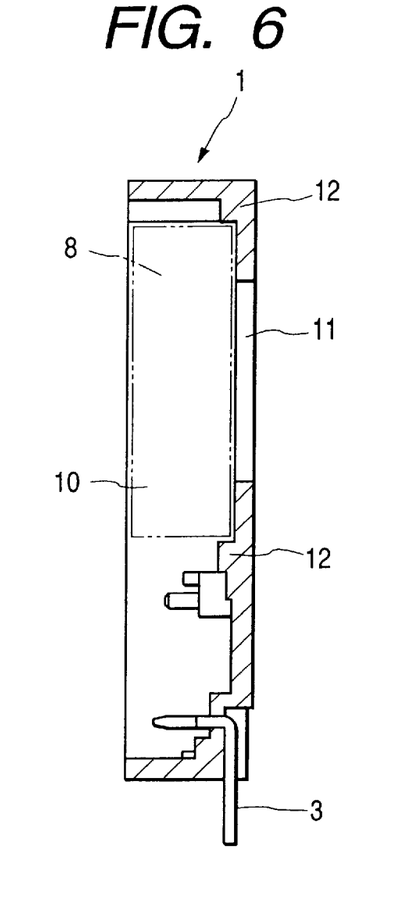
FIG. 6 is a vertical cross-sectional view of the housing.
Figure 7:
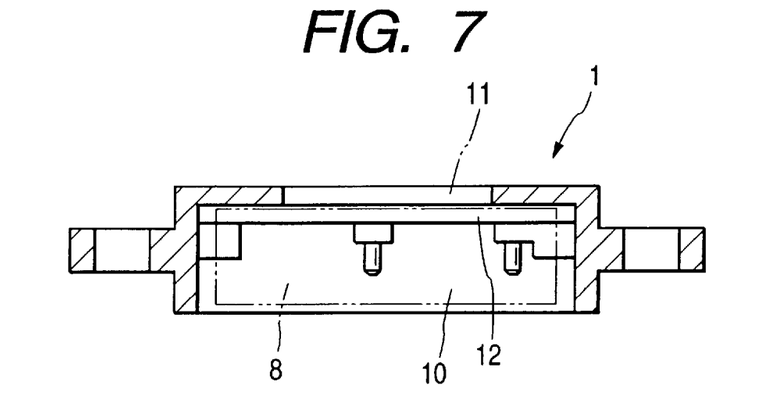
FIG. 7 is a horizontal cross-sectional view of the housing.

FIGS. 5, 6, and 7 are a front view, a vertical cross-sectional view, and a horizontal cross-sectional view of the housing 1, respectively. As shown by these figures, the housing 1, constructed from a synthetic resin which is of almost box shape, has a concave housing part 10 formed inside it and a through hole 11 provided at a position corresponding to the bottom of the concave housing part 10. At the top and bottom of the concave housing part 10 are provided guide stage parts 12 which extend in parallel to the X direction, and a third supporting member is formed by supporting the second supporting member 8 movably in the X direction by the guide stage part 12.

Figure 8:
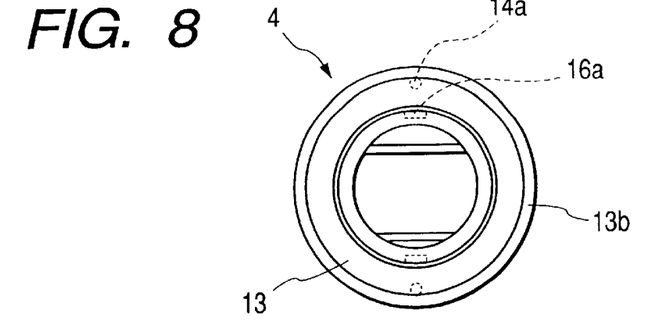
FIG. 8 is a front view of a rotor used in the rotation sensor.
Figure 9:
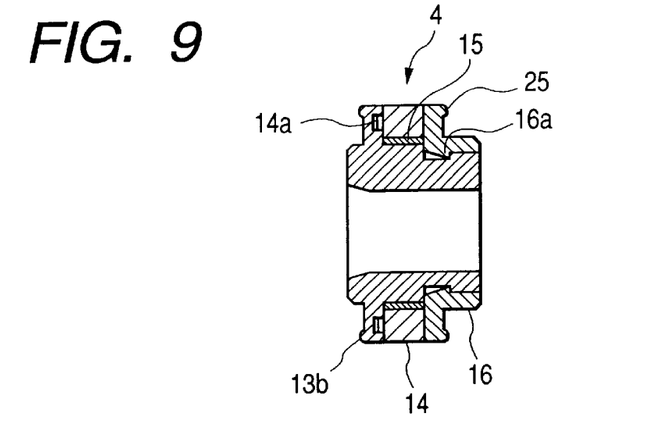
FIG. 9 is a vertical cross-sectional view of the rotor.
Figure 10:
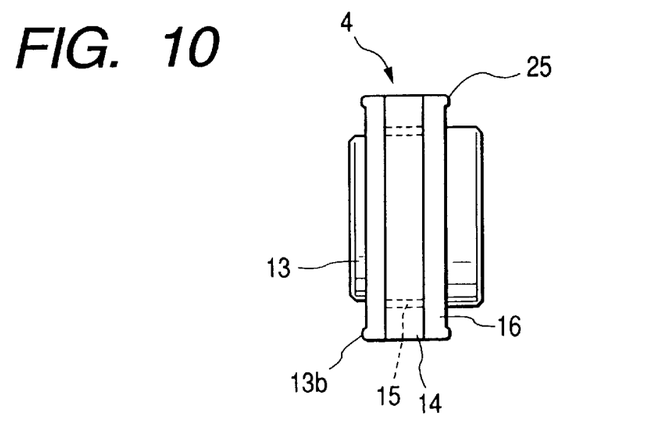
FIG. 10 is a side view of the rotor.
Figure 11:
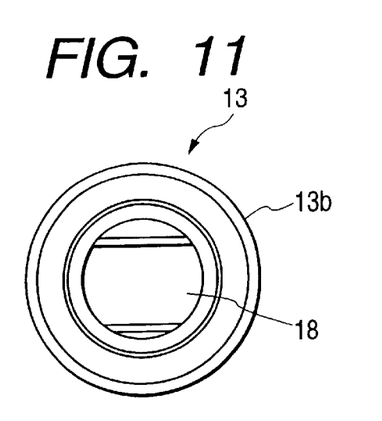
FIG. 11 is a front view of a core supporter used in the rotation sensor.
Figure 12:
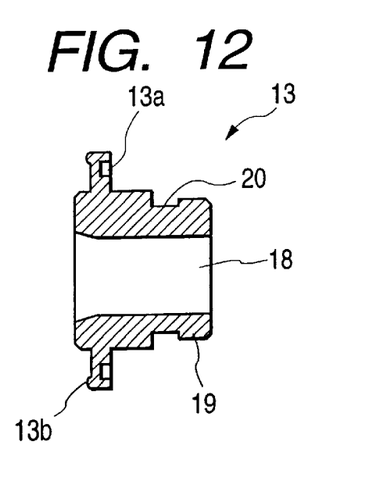
FIG. 12 is a vertical cross-sectional view of the core supporter.
Figure 13:
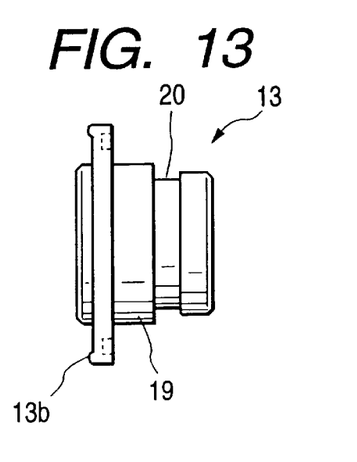
FIG. 13 is a side view of the core supporter.

FIGS. 8, 9, and 10 are a front view, a vertical cross-sectional view, and a side view of the rotor 4, respectively. FIGS. 11, 12, and 13 are a front view, a vertical cross-sectional view, and a side view of a core supporting member 13 used for the rotor 4, respectively.

The rotor 4 comprises a core supporter 13, a core ring 14 supported thereby, a magnetic shield ring 15, and a core ring supporting member 16 for supporting the core ring 14 to the core supporter 13. The core supporter 13 is constructed from a synthetic resin which is of almost cylindrical shape, and has a non-circular engagement hole 18 formed inside it, through which a rotating shaft 17 (e.g., a metallic rotating shaft connected to a throttle valve. See FIGS. 1 and 9), a rotor of a detection side, is fitted.

On the cylindrical part 19 of the core supporter 13 are successively fitted a magnetic shield ring 15, a core ring 14, and a core ring supporting member 16. In this case, a concave part 13a provided in the flange of the core supporter 13 and a projected part 14a provided in the core ring 14 engage with each other to determine the position of a rotation direction. An anchoring groove 20 of circular ring shape is formed on the circumferential side of the cylindrical part 19, a projection part 16a inserted in the anchoring groove 20 is provided on the inner circumferential side of the core ring supporting member 16, and the engagement of the anchoring groove 20 and the projection part 16a causes the core ring 14 to rotate integrally while being supported in a sandwiched form between the core supporter 13 and the core ring supporting member 16. The core ring 14, which is constructed from, e.g., a plastic magnet, although not shown, is magnetized to the N or S pole on the circumferential side of the core ring 14 to maintain a proper positional relationship with the engagement hole.

The above described magnetic shield ring 15 is provided to prevent a situation in which a rotating shaft constructed from magnetic members such as iron exerts an influence on a flux distribution of the core ring 14 and output changes depending on the existence of the rotating shaft (because a reference value is determined in the state in which no rotating shaft exists) and the shape thereof, so that a reference value is not obtained.

Figure 14:
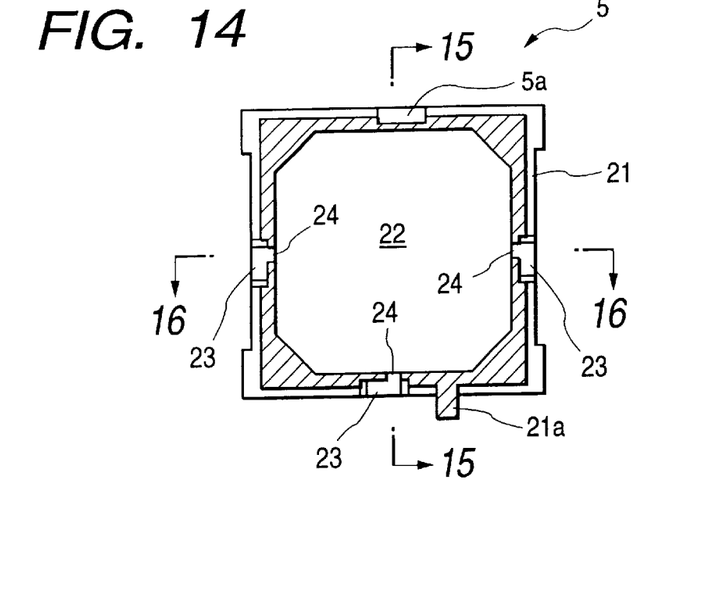
FIG. 14 is a front cross-sectional view of a first supporter used in the rotation sensor.
Figure 15:
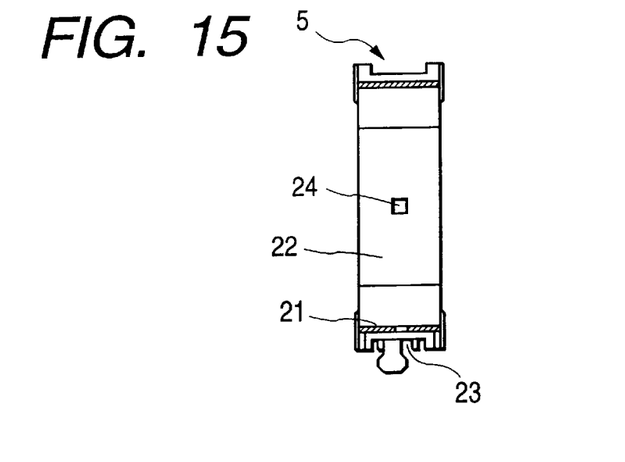
FIG. 15 is a cross-sectional view taken along the line 15—15 of FIG. 14.
Figure 16:
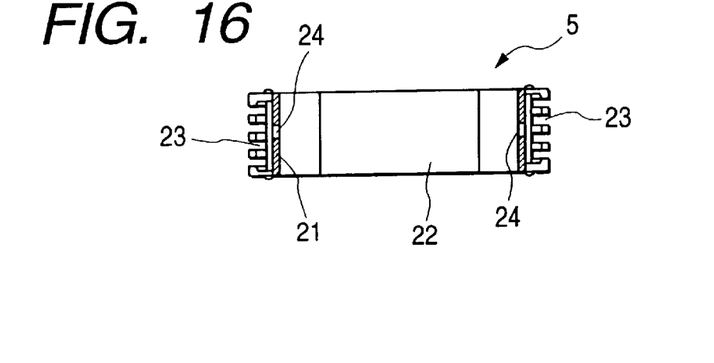
FIG. 16 is a cross-sectional view taken along the line 16—16 of FIG. 14.
Figure 17:
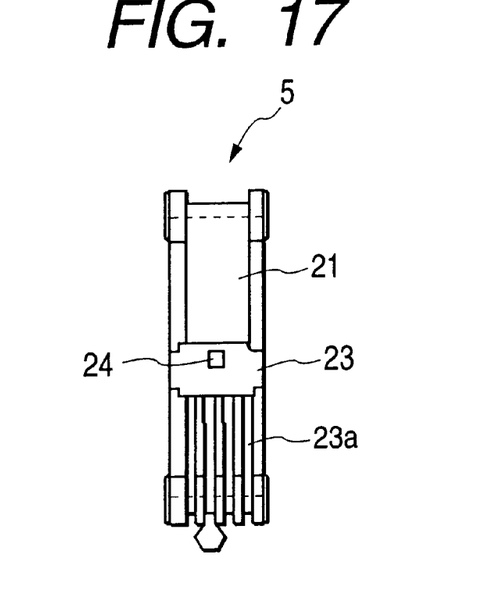
FIG. 17 is a side view of the first supporter.
Figure 18:
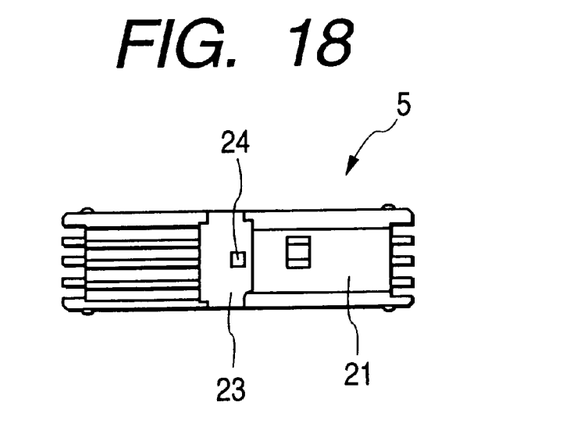
FIG. 18 is a bottom view of the first supporter.

FIG. 14 is a front cross-sectional view of the first supporter 5; FIG. 15, a cross-sectional view taken along the line 15—15 of FIG. 14; FIG. 16, a cross-sectional view taken along the line 16—16 of FIG. 14; and FIGS. 17 and 18 are a side view and a bottom view of the first supporter 5, respectively.

The first supporter 5 is constructed from a synthetic resin and has a frame part 21 of almost rectangular shape, and has a housing part 22 at the center of the front to house most of the rotor 4, as shown in FIG. 14. Element securing parts 23 are concavely mounted, and groove parts 23a are continuously provided, so as to receive and guide the terminals of the detecting members 6. Small holes 24 are formed in positions opposite to the housing part 22 of the element securing parts 23. As shown in FIG. 2, each detecting member 6 is completely buried in the housing part 22. A projection 21a is provided at the bottom of the housing part 22 upon which a flexible printed board 7 is fitted, and both are integrated so that no stress is applied to the soldering parts of the detecting members 6 as the supporter 5 moves.

The rotor 4 is inserted from the front of the housing part 22 with some pressure at a total of four locations, the three element securing parts 23 and the concave part 5a which contact tightly with the rotor 4 and bend evenly. Therefore, the rotor 4 does not go off-center in the X and Y directions and is supported without backlash. For the shaft line direction, an anchoring claw 25 (see FIGS. 9 or 10) projected in ring shape in the core ring supporting member 16 of the rotor 4 contacts tightly with a second supporter 8 as shown in FIGS. 3 and 4, and a projection 13b convexly provided in ring shape in a core supporter 13 contacts tightly with a cover 9. Therefore, the rotor is supported without backlash so that it can rotate smoothly. As shown in FIG. 2, in this support state, each detecting member 6 is disposed in opposed relation to and close to a magnetized portion of the core ring 14 via a small hole 24.

Figure 19:
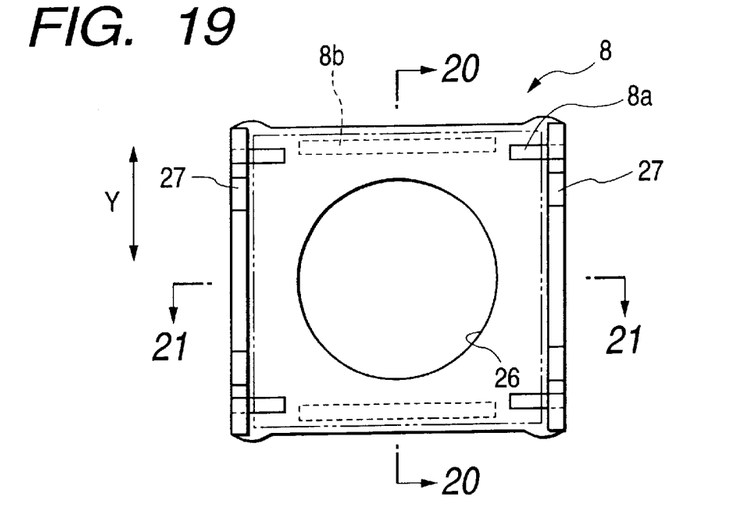
FIG. 19 is a front view of a second supporter used in the rotation sensor.
Figure 20:
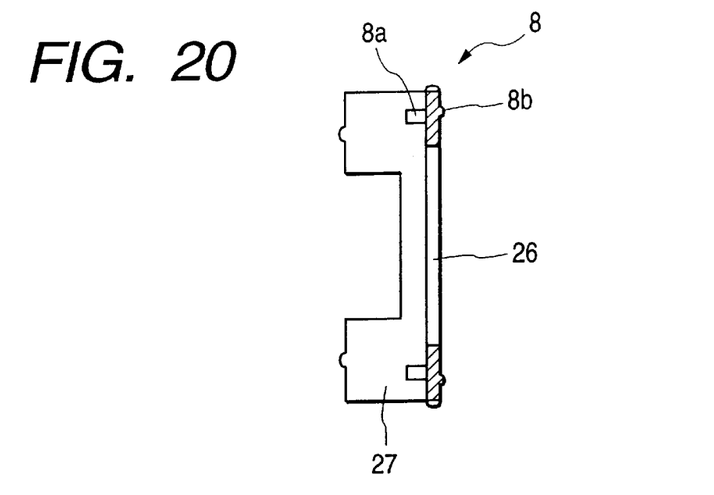
FIG. 20 is a cross-sectional view taken along the line 20—20 of FIG. 19.
Figure 21:
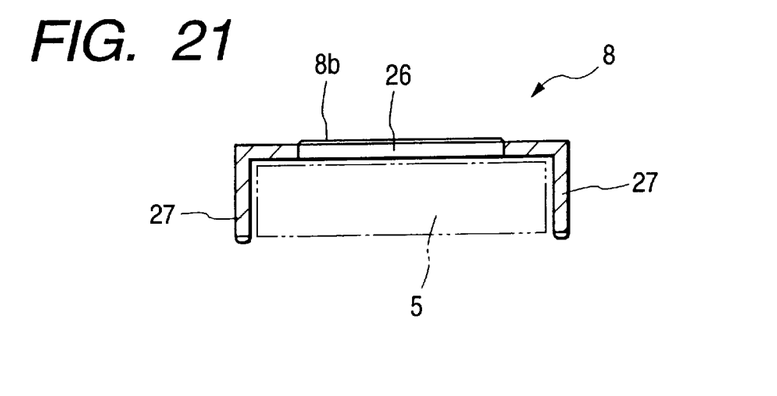
FIG. 21 is a cross-sectional view taken along the line 21—21 of FIG. 19.
Figure 22:
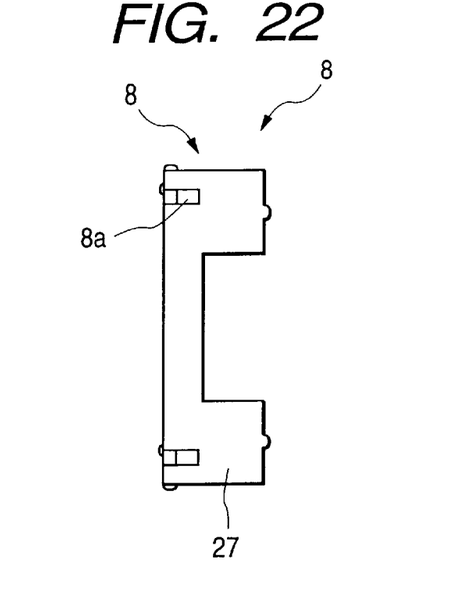
FIG. 22 is a side view of the second supporter.

FIG. 19 is a front view of the second supporter 8; FIG. 20, a cross-sectional view taken along the line 20—20 of FIG. 19; FIG. 21, a cross-sectional view taken along the line 21—21 of FIG. 19; and FIG. 22, a side view of the second supporter 8.

The second supporter 8 is constructed from a synthetic resin, is rectangular in front shape, has a through hole 26 formed at the central portion thereof, and has guide walls 27 provided in the both sides which extend backward. As shown in FIGS. 4, 19, and 21, a first supporter 5 is supported with some pressure between the guide walls 27 in both sides. But since a side opposite to the base is open, the supporter 8 can bend and move vertically without backlash in the X direction, that is, is supported movably in the Y direction as shown in FIG. 2.

L-shaped holes 8a extending between the base forming the through hole 26 and the guide walls 27 are provided at the four corners, so that the supporter 8 can bend slightly in the Y direction and is supported in a sandwiched form without backlash between the guide stages 12. Projected parts 8b are formed along the X direction on the back of the base, so that the supporter 8 can move without backlash in the Y direction and smoothly in the X direction.

As shown in FIG. 1, a through hole 29 is formed at a predetermined position of the cover 9. The rotor 4 is supported rotatably by the first supporter 5 as shown by the dotted arrow in FIG. 1, the first supporter 5 is supported movably by the second supporter 8 only in the Y direction orthogonal to the rotating shaft direction of the rotor 4, the second supporter 8 is supported movably by the housing 1 (a third supporter) only in the X direction orthogonal to the rotating shaft direction of the rotor 4, a snap foot 9a of the cover 9 engages with a projection 1a on the side of the housing 1 to support the supporter 8, and the openings of the housing 1 are covered with the cover 9.

In the assembled rotation sensor, as shown in FIG. 4, the core supporter 13 (cylindrical part 19) is loosely inserted around it in the through hole 11 of the housing 1, the through hole 26 of the second supporter 8, and the through hole 29 of the cover 9, and extends outward from the housing 1 and the cover 9.

The rotating shaft 17 is inserted and engaged in the engagement hole 18 of the core supporter 13, and the rotor 4 rotates together with the rotating shaft 17, while the first supporter 5 is prevented from rotating by the second supporter 8 and the housing 1 (third supporter). A rotation state of the rotating shaft 17 is detected and outputted using a magnetic variable resistor by plural detecting members (hole ICs) via the rotor 4 (core ring 14).

Although the first supporter can also be cylindrical in shape, if the shape of the first supporter is rectangular as in the above described embodiment, since the first supporter contacts with the second supporter in four locations, a high dimensional accuracy is obtained, so that the first supporter can be supported stably without backlash.

Although the housing is used also as the third supporter in the above described embodiment, the present invention is not limited to the above embodiment. For example, an exterior member of the sensor in another fixed state such as the cover can also be used as a third supporter.

In the above described embodiment, the rotor is provided with a magnetized portion and a hole IC is used in the detecting member to magnetically detect a rotation state. However, the present invention is not limited to the above embodiment. For example, a rotor is provided with a part having a high reflectivity and a part having a low reflectivity, and a detecting member is provided with a light emitting element and a light receiving element, whereby a rotation state can be optically detected.

In the above described embodiment, a flexible printed wiring board is used between a detecting member and a terminal. However, the present invention is not limited to the above embodiment. Other flexible connecting wires such as coated signal wires may be used as signal wires.

A rotation sensor according to the present invention is applicable not only to throttle position sensors but also to rotation sensors of other uses such as encoders. Further, the configuration according to the present invention is applicable to variable resistors and contact sensors.

According to the present invention, as previously described, since both the rotor and the detecting member for detecting a rotation state thereof are supported by the first supporting member, and the rotor and the detecting member are movable together in the X and Y directions, even if the rotation portion becomes eccentric, the rotor and the detecting member together can follow the eccentricity and the spacing between the rotor and the detecting member is always constant, and therefore there is no output variation due to the eccentricity of the rotation portion.

Since this construction eliminates the need to support the shaft at two points, there can be provided a rotation sensor which is free of decrease in actuating force, capable of correct detection of a rotation state, and highly reliable.

What is claimed is:

1. A rotation sensor comprising:
   a rotor rotating together with a rotation portion of a detection side;
   a first supporting member for rotatably supporting the rotor;
   a second supporting member for supporting said first supporting member;
   a third supporting member for supporting the second supporting member; and a detecting member, secured to said first supporting member, for detecting a rotation state of said rotor, wherein said first supporting member is supported movably in both directions, that is, an X direction which is orthogonal to the direction of the rotating shaft of said rotor and a Y direction which is orthogonal to the direction of the rotating shaft of said rotor and orthogonal to said X direction, wherein said first supporting member is supported movably to the Y direction by said second supporting member, and wherein said second supporting member is supported movably to the X direction by said third supporting member.

2. The rotation sensor according to claim 1, wherein both said first supporting member and said third supporting member are constructed from a synthetic resin and said second supporting member is constructed from metal.

3. The rotation sensor according to claim 1, wherein Y-direction guide means which permits the travel of said first supporting member in the Y direction and prevents the travel thereof in the X direction is provided in said second supporting member, and X-direction guide means which permits the travel of said second supporting member in the X direction and prevents the travel thereof in the Y direction is provided in said third supporting member.

4. The rotation sensor according to claim 1, wherein said third supporting member is constructed from a synthetic resin and is formed with an exterior member of the sensor in a fixed state.

5. The rotation sensor according to claim 1, wherein a terminal is provided in said third supporting member, and said terminal and said detecting member are connected by a flexible connecting wire.

6. The rotation sensor according to claim 1, wherein a concave housing part is formed in said first supporting member and the detecting member is inserted and secured within the housing member, and thereby the detecting member is disposed close to said rotor.

7. The rotation sensor according to claim 1, wherein said first supporting member is of shape of almost rectangular frame and the first supporting member is disposed in sliding on said second supporting member.

8. The rotation sensor according to claim 1, wherein said rotor has a magnetized portion on the circumferential side thereof and said detecting member is a magnetism detecting element.

9. The rotation sensor according to claim 1, wherein the rotation part of said detection side is a throttle valve.

* * * * *